United States Patent Office 3,522,242
Patented July 28, 1970

3,522,242
1-[4'-(β-ACYLAMINO-ETHYLSULFONYL)-
PHENYL]-3-ARYL-Δ₂-PYRAZOLINES
Erich Schinzel, Frankfurt am Main, Siegfried Bildstein, Kelkheim, Taunus, and Karl Heinz Lebkucher, Hofheim, Taunus, Germany, assignors to Farbwerke Hoechst Aktiengesellschaft vormals Meister Lucius & Bruning, Frankfurt am Main, Germany, a corporation of Germany
No Drawing. Filed July 14, 1967, Ser. No. 653,323
Int. Cl. C07d 49/10
U.S. Cl. 260—239.9                                  8 Claims

ABSTRACT OF THE DISCLOSURE

1-[4'-(β-acylamino-ethylsulfonyl)-phenyl] - 3 - aryl-Δ₂-pyrazolines of the Formula A

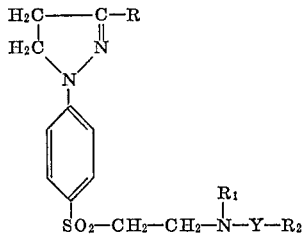

wherein R represents phenyl or p-chloro-phenyl, Y stands for carbonyl or sulfonyl, $R_1$ represents hydrogen, alkyl containing up to 20 carbon atoms, phenyl, lower alkoxy phenyl, or benzyl, and $R_2$ represents alkyl containing from 1 to 4 carbon atoms, cycloalkyl, phenyl, p-tolyl, lower alkoxy-phenyl, arylphenyl or styryl, and process for their manufacture.

---

The present invention relates to new pyrazoline derivatives, preferably 1-[4'-(β-acylamino - ethylsulfonyl)-phenyl]-3-aryl-Δ₂-pyrazolines, in particular those of the general Formula A

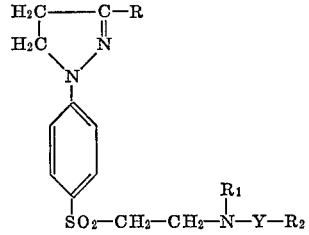

in which R represents an aryl radical, which may be substituted, in particular a phenyl radical and preferably a p-chlorophenyl radical, Y a —CO— group or —SO₂— group, $R_1$ represents hydrogen, an alkyl group with up to 20 carbon atoms, a phenyl radical which may be substituted, or an aralkyl radical, and $R_2$ a lower alkyl group, a cycloalkyl group, an aryl radical which may be substituted, and the styryl group, as well as a process for their preparation and their use as optical brighteners.

Now it has been found, that the 1-[4'-(β-acylamino-ethylsulfonyl)-phenyl]-3-aryl-Δ₂-pyrazolines of the general Formula A can be obtained by adding to 1-(4'-vinylsulfonylphenyl)-3-aryl-Δ₂-pyrazolines, obtainable, for example according to the method described in U.S. Pat. No. 3,255,203, carboxylic acid or sulfonic acid amines which at the nitrogen of the amide have at least one nydrogen atom.

The reaction takes place according to the following scheme:

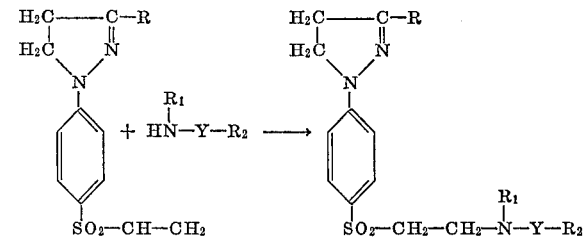

This addition takes place while heating an intimate mixture of the vinylsulfone compound with the carboxylic acid or sulfonic acid amide in the presence of catalytical quantities of alkaline agents, preferably in the presence of sodium methylate, to temperatures of 100°–200° C., preferably 115°–140° C.

As carboxylic acid or sulfonic acid amides which at the nitrogen of the amide have at least one hydrogen atom, there may be mentioned, for example: acetamide, propionic acid amide, n-butyric acid amide, isobutyric acid amide, n-valerianic acid amide, iso-valerianic acid amide, capronic acid amide, diethylacetic amide, hexahydro - benzamide, 4-methyl-hexahydrobenzamide, benzamide, 4-methyl-benzamide, 4-chloro-benzamide, 4-methoxy- and 4-ethoxy-benzamide, cinnamic acid amide, N-methylacetamide, N-ethylacetamide, N-n-propyl- and N-iso-propyl-acetamide, N-n-butyl-acetamide, N-iso-butyl-acetamide, N-dodecyl-acetamide, N-stearyl-acetamide, N-methyl - hexahydro-benzamide, N-methyl-benzamide, N-methyl-cinnamic acid amide, acetanilide, 2-, 3- and 4-acetamino-toluene, 4-acetaminoo-anisol, 4-acetamino-phenetol, 4-acetamino-chlorobenzene, N-benzyl-acetamide, n-butyric acid anilide, hexahydro-benzanilide, benzanilide, cinnamic acid anilide, methanesulfonic acid amide, ethanesulfonic acid amide, benzene-sulfonic acid amide, benzene sulfonic acid methylamide, toluene-4-sulfonic acid amide, toluene-4-sulfonic acid-methylamide, toluene-4-sulfonic acid-butylamide, toluene-4-sulfonic acid stearylamide, toluene-4-sulfonic acid anilide, toluene-4-sufonic acid-benzylamide.

Another process for the preparation of the compounds according to the present invention consists in reacting 1-[4'-(β - amino-ethylsulfonyl)-phenyl]-3-aryl-Δ₂-pyrazolines which at the nitrogen of the amine have at least one hydrogen atom and which may be obtained, for example, according to the method described in Canadian Pat. No. 758,075 with carboxylic acid and sulfonic acid chlorides according to the following reaction equation:

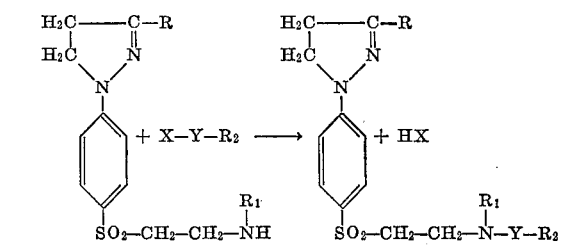

This reaction is carried out in the presence of acid fixing agents, for example, in the presence of pyridine bases, at temperatures ranging between 0–100° C., preferably at 0–45° C.

As carboxylic acid and sulfonic acid chlorides there may be mentioned, for example: acetic acid chloride, propionic acid chloride, n-butyric acid chloride, isobutyric acid chloride, n-valerianic acid chloride, hexahydrobenzoylchloride, 4-methyl-hexahydrobenzoylchloride, benzoylchloride, 4-methylbenzoylchloride, 4-chlorobenzoylchloride, 4-methoxy and 4-ethoxy-benzoylchloride, diphenyl-4-carboxylic acid chloride, cinnamic acid chloride, methane-sulfonic acid chloride, ethane-sulfonic acid chloride, benzenesulfonic acid chloride, toluene-4-sulfonic acid chloride.

As 1-(4'-vinylsulfonyl-phenyl) - 3 - aryl-$\Delta_2$-pyrazolines and 1 - [4' - ($\beta$-aminoethylsulfonyl)-phenyl] - 3 - aryl-$\Delta_2$-pyrazolines there are to be mentioned, for instance, those in which the aryl radical represents a phenyl radical or an alkylated, alkoxylated, halogenated phenyl radical or one which has an acylamino group, for instance 4-methylphenyl-, 4-methoxyphenyl-, 4-acetaminophenyl-, 4-ethoxyphenyl-, 4-bromophenyl-, and 3,4-dichlorophenyl-. Of particular interest are those compounds in which the aryl radical (R) represents a phenyl or p-chloro-phenyl radical.

Furthermore, the compounds according to the present invention can be obtained by the action of alkylating agents as, for instance, dimethyl- or diethylsulfate on those compounds of the general Formula A, in which $R_1$ represents a hydrogen atom and Y a —$SO_2$ group.

The condensation of eventually substituted $\omega$-chloropropiophenones with phenyl-hydrazines which in position p have the —$SO_2$—$CH_2$—$CH_2$—N—Y—$R_2$ -radical leads to $\Delta_2$-pyrazolines of the general Formula A as well.

The mentioned substituents R, $R_1$, $R_2$ and Y have the means given above, X stands for chlorine.

The $\Delta_2$-pyrazolines of the general Formula A, obtained according to the present invention, are almost colourless or respectively weakly yellow products which are especially appropriate as UV-absorbents for materials to be reproduced such, for example, as papers.

It has furthermore been found that almost colourless or respectively weakly yellow, fluorescing $\Delta_2$-pyrazolines of the general formula

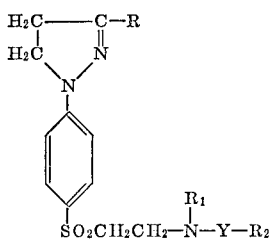

can be used with excellent results as optical brighteners.

The new compounds distinguish by their outstanding fluorescing capacity and good fastness to light when brightening fibrous materials of cotton, polyacrylonitrile, and its copolymers, above all, however, of cellulose 2 1/2— and triacetate, polyamide and wool.

The compounds according to the present invention are distinguished furthermore, by a very good resistance to hypochlorite and waste gases. The resistance to waste gases is in particular in the case of brightening agents for cellulose 2 1/2 and triacetate fibres a most valuable property. The brightening agents according to the present invention can be applied in known manner, either in form of solutions in organic solvents or in form of aqueous dispersions, eventually with the aid of dispersing agents. The quantities required, which may vary within wide limits are easily to be determined by preliminary tests.

The new compounds can be added to commercial detergents, even if these contain oxidative bleaching agents such, for example, as perborate, in order to improve the aspect of the washed goods. Furthermore, the new compounds can as well be applied together with reductive chemical bleaching agents, e.g. sodium dithionite, sodium boron-hydride, and the like.

The new substances may be applied in combination with appropriate textile auxiliary agents, such as antistatics, plasticizers, hydrophobizing agents and the like, whereby good brightening and impregnating effects are obtained in one operating phase only. Another field of application of these substances consists in their use in dye-baths, being obtained vivid, brilliant tints, which are especially desired in the case of pastel shades. Furthermore, they can be added to spinning and moulding masses, consisting for example of polymerization products of vinyl chloride, vinylidene chloride, polyethylene, polypropylene and others which serve for the manufacture of man-made fibres, filaments, films, foils, ribbons and other structures.

The following examples are intended to show the multifold possibilities of application.

EXAMPLE 1

41.6 parts by weight of 1-(4'-vinylsulfonyl-phenyl)-3-(p-chlorophenyl)-$\Delta_2$-pyrazoline are together with 12 parts by weight of acetamide and 2 parts by weight of sodium methylate intimately mixed and heated to 135–140° C. for 10 minutes. The melt formed solidifies soon. After cooling off, the crystallization product is ground, extracted by boiling together with 200 parts by volume of methanol, separated from the non-dissolved parts and after-washed with 200 parts by volume of cold methanol. The acetamide addition product VI (cf. table) shows, after recrystalllizing several times from glacial acetic acid, a melting point of 211–212° C.

EXAMPLE 2

9.36 parts by weight of 1-(4'-vinylsulfonyl-phenyl)-3-phenyl-$\Delta_2$-pyrazoline are, together with 2.95 parts by weight of acetamide and 0.5 part by weight of sodium methylate, intimately mixed and heated for 10 minutes to 115–120° C. The melt formed solidifies while cooling. The crystallization product is ground and extracted with 40 parts by volume of cold methanol. The additional product corresponding to Formula I (cf. table) shows, after recrystallizing several times from methanol, a melting point of 147–148° C.

EXAMPLE 3

13.6 parts by weight of 1-[4'-($\beta$-benzylamino-ethylsulfonyl)-phenyl]-3-(p-chlorophenyl) - $\Delta_2$ - pyrazoline are pasted up in 40 parts by volume of pyridine. At 0–5° C., 6 parts by weight of 4-methoxy-benzoylchloride are added dropwise and then it is stirred for 1½ hours at room temperature. The reaction product is treated with approximately 100 parts by volume of methanol, cooled in the ice-bath and the acylation product which has precipitated is filtered off with suction and washed with methanol. Thus obtained Compound XV (cf. table) shows, after recrystallizing several times from methanol, a melting point of 122–124° C.

EXAMPLE 4

12.57 parts by weight of 1-[4'-($\beta$-benzylamino-ethylsulfonyl)-phenyl]-3-phenyl-$\Delta_2$-pyrazoline are brought into 40 parts by volume of pyridine and at 0–10° C. added dropwise to 5.0 parts by weight of methane-sulfochloride, while stirring. Then the batch is heated to 40–45° C., the temperature is maintained for one hour, cooled down to room temperature again and the precipitate is filtered off with suction and washed with methanol. After recrystallizing several times from chlorobenzene the sulfonamide melts at 175–176° C.

EXAMPLE 5

10.4 parts by weight of 1-(4'-vinylsulfonylphenyl)-3-(p-chlorophenyl)-$\Delta_2$-pyrazoline are intimately mixed together with 9 parts by weight of toluene-4-sulfonamide and 1 part by weight of sodium methylate and heated for 5 minutes to 160–180° C. The melt formed is triturated, after cooling off, with 60 parts by volume of methanol whereby crystallization occurs. It is filtered off with suction and after-washed with methanol. After recrystallizing several times from chlorobenzene the compounds obtained XIX (cf. table) has a melting point of 200–202° C.

EXAMPLE 6

13.6 parts by weight of 1 - [4' - ($\beta$-benzylamino-ethylsulfonyl)-phenyl]-3-(p-chlorophenyl)-$\Delta_2$-pyrazoline are dissolved in 4 parts by volume of pyridine and, at a temperature of 0–5° C. added dropwise with 7.5 parts of acetylchloride. Then it is stirred for approximately 1 hour at 40–45° C., the batch is put on ice, the acetylation product which has formed is filtered off with suction after solidifying and thoroughly washed with water. After recrystallizing several times from methanol the Compound IV (cf. table) obtained melts at 159–160° C.

EXAMPLE 7

A cellulose 2½ acetate fabric which has been pre-bleached in the usual manner is treated with an aqueous dispersion (goods-to-liquor ratio of 1:20) which contains per litre 0.15 g. of Compound VI (cf. table) and
1 ml. of formic acid (at 85% strength)

for 30 minutes at a temperature of 80° C. The ascertainment of the degree of whiteness which is effected with the Zeiss-Elephro device at a wave length of 460$\mu$, shows an increase of 20% in comparison with the non-brightened fabric.

In order to obtain the aqueous dispersion 0.15 g. of Compound VI were dissolved in 7.5 l. of dimethylformamide and this solution was introduced into 1 l. of hot water containing 0.38 g. of the dissolved oxethylation product out of nonlyphenol and 23 moles of ethyleneoxide.

A cellulose triacetate fabric bleached in the same way shows an improvement in the degree of whiteness of 15%.

EXAMPLE 8

A woolen fabric bleached in the usual manner is treated, at a goods-to-liquor ratio of 1:20, at 60° C., for 45 minutes with an aqueous dispersion which contains per litre 0.3 g. of Compound I (cf. table)
1.2 g. of sodium dithionite and
0.8 g. of sodium pyrophosphate By this treatment an increase in the degree of whiteness of 11% is to be realised.

The aqueous dispersion was prepared in the manner indicated in Example 7.

EXAMPLE 9

A bleached woolen fabric is treated for 45 minutes in a long bath (1:20) at 60° C. with an aqueous dispersion which contains per litre 0.2 g. of Compound XV (cf. table)
1.2 g. of sodium dithionite and
0.8 g. of sodium pyrophosphate The result of this treatment is an improvement of the degree of whiteness of 10% in comparison to the non-brightened fabric.

The aqueous dispersion was prepared analogously to Example 7.

EXAMPLE 10

A fabric consisting of at least 85% of polyacrylonitrile is, at a goods-to-liquor ratio of 1:20, treated for 30 minutes at 98° C. with an aqueous dispersion which contains per litre 0.2 g. of Compound I (cf. table)
1 ml. of formic acid (at 85% strength) and
1 g. of alkylarylpolyglycol ether The improvement of the whitening effect as compared to the original fabric amounts to 10%.

If instead of Compound I Compound V is used in the same quantity the operation remaining the same, the brightening effect amounts to 10% as well.

The disperson was prepared as described in Example 7.

EXAMPLE 11

A polycaprolactam fabric bleached in the usual way is treated at 60° C. at a goods-to-liquor ratio of 1:20 for 30 minutes with an aqueous dispersion which contains per litre 0.15 g. of Compound XIX (cf. table) and
1.00 g. of sodium carbonate In comparison to the non-brightened fabric an increase in the degree of whiteness of 10% is achieved.

The aqueous dispersion was prepared in the manner described in Example 7. When applying the same quantity of Compound I instead of XIX the increase in reflectance is 12%, when using Compound IX 10%.

A brightening effect of 10% is equally obtained if the same quantity of Compound VI and 1 ml. of formic acid instead of sodium carbonate are used, the other conditions remaining the same.

TABLE

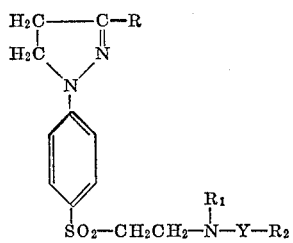

| No. | R | Y | $R_1$ | $R_2$ | M.P.,° |
|---|---|---|---|---|---|
| I | —C$_6$H$_5$ | —CO— | —H | —CH$_3$ | 147–148 |
| II | Same as above | —CO— | —CH$_2$C$_6$H$_5$ | —CH$_3$ | 130–132 |
| III | do | —CO— | —C$_6$H$_4$—OCH$_3$ | —CH$_3$ | 178–179 |
| IV | do | —SO$_2$— | —H | —CH$_3$ | 199–201 |

TABLE—Continued

| No. | R | Y | $R_1$ | $R_2$ | M.P.,° |
|---|---|---|---|---|---|
| V | do | —SO₂— | —CH₂C₆H₅ | —CH₃ | 175–176 |
| VI | —C₆H₄—Cl | —CO— | —H | —CH₃ | 211–212 |
| VII | Same as above | —CO— | —C₆H₅ | —CH₃ | 175–177 |
| VIII | do | —CO— | —C₆H₄—OCH₃ | —CH₃ | 160–161 |
| IX | do | —CO— | —CH₂C₆H₅ | —CH₃ | 159–160 |
| X | do | —CO— | —H | —CH₂CH₂CH₃ | 205–207 |
| XI | do | —CO— | —H | —CH(CH₂CH₂)(CH₂CH₂)CH₂ (cyclopentyl) | 272–274 |
| XII | do | —CO— | —CH₃ | Same as above | 166–167 |
| XIII | do | —CO— | —H | —C₆H₅ | 270–272 |
| XIV | do | —CO— | —CH₃ | —C₆H₄—OCH₃ | 108–109 |
| XV | do | —CO— | —CH₂C₆H₅ | Same as above | 122–124 |
| XVI | do | —CO— | —CH₃ | —C₆H₄—C₆H₅ | 166–168 |
| XVII | do | —CO— | —CH₃ | —CH=CH—C₆H₅ | 198–200 |
| XVIII | do | —SO₂— | —CH₂C₆H₅ | —CH₃ | 210–211 |
| XIX | do | —SO₂— | —H | —C₆H₄—CH₃ | 200–202 |
| XX | do | —SO₂— | —CH₃ | Same as above | 181–183 |
| XXI | do | —SO₂— | —C₄H₉(n) | do | 161–162 |
| XXII | do | —SO₂— | —C₁₈H₃₇(n) | do | 126–127 |
| XXIII | do | —SO₂— | —C₆H₅ | do | 183–185 |
| XXIV | do | —SO₂— | —H | —CH₃ | 186–187 |

We claim:

1. 1-[4′-(β-acylamino - ethylsulfonyl) - phenyl]-3-aryl-Δ-2-pyrazoline of the formula

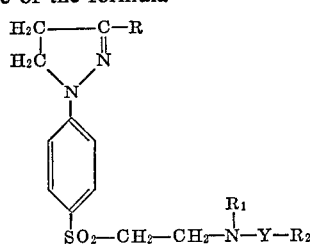

wherein R represents phenyl or p-chloro-phenyl, Y stands for carbonyl or sulfonyl, $R_1$ represents hydrogen, alkyl containing up to 20 carbon atoms, phenyl, lower alkoxy phenyl, or benzyl and $R_2$ represents alkyl containing from 1 to 4 carbon atoms cycloalkyl, phenyl, p-toyl lower alkoxy-phenyl, biphenylyl or styryl.

2. The compound of the formula

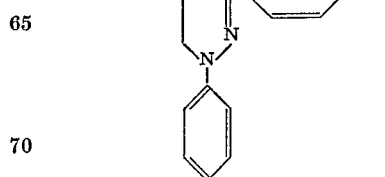

3. Compound as defined in claim 1 wherein R is p-chloro phenyl, $R_1$ is H, Y is carbonyl and $R_2$ is n-propyl.

4. Compound as defined in claim 1 wherein R is p-chloro phenyl, $R_1$ is H, Y is carbonyl and $R_2$ is phenyl.

5. Compound as defined in claim 1 wherein R is p-chloro phenyl, $R_1$ is H, Y is sulfonyl and $R_2$ is methyl.

6. Compound as defined in claim 1 wherein R is phenyl, $R_1$ is H, Y is carbonyl and $R_2$ is methyl.

7. Compound as defined in claim 1 wherein R is p-chloro phenyl, $R_1$ is H, Y is sulfonyl and $R_2$ is p-methylphenyl.

8. Compound as defined in claim 1 wherein R is p-chloro phenyl, $R_1$ is benzyl, Y is carbonyl and $R_2$ is p-methoxyphenyl.

References Cited

UNITED STATES PATENTS 3,255,203　6/1966　Schinzel et al. _____ 260—239.9
3,133,080　5/1964　Sarkar et al. _____ 260—310

NORMA S. MILESTONE, Primary Examiner

C. M. SHURKO, Assistant Examiner

U.S. Cl. X.R.

117—33.5; 252—8.75, 161, 301.2; 260—240.9